United States Patent
Kirubalaratnam et al.

(10) Patent No.: US 6,917,898 B1
(45) Date of Patent: Jul. 12, 2005

(54) GENERATION AND PROCESSING OF STATISTICAL INFORMATION

(75) Inventors: Nithyaganesh Kirubalaratnam, Galway (IE); Tony McCormack, Galway (IE); Paul D'Arcy, Galway (IE)

(73) Assignee: Nortel Networks Limited, St. Laurent (CA)

( * ) Notice: Subject to any disclaimer, the term of this patent is extended or adjusted under 35 U.S.C. 154(b) by 79 days.

(21) Appl. No.: 10/675,768

(22) Filed: Sep. 30, 2003

(51) Int. Cl.[7] ............................................. G06F 17/18
(52) U.S. Cl. ..................... 702/179; 702/80; 702/187; 702/188
(58) Field of Search ............................. 702/57, 79, 80, 702/179, 180, 182, 186, 187, 188, 189; 379/114.01, 133, 134, 136, 137

(56) References Cited

U.S. PATENT DOCUMENTS 5,170,359 A * 12/1992 Sax et al. ..................... 702/73
5,862,203 A * 1/1999 Wulkan et al. ........ 379/114.02

* cited by examiner

Primary Examiner—Bryan Bui
(74) Attorney, Agent, or Firm—Barnes & Thornburg

(57) ABSTRACT

A method and system are provided for generating statistical information from input data relating to the operation of a monitored system over time. The monitored system is preferably a contact center or call centre. The method involves pegging input data relating to the operation of the system over a finite time interval and storing this pegged data in a record so that the contents of the record are identifiable according to the finite time interval to which the data relates. This pegging is repeated continually resulting in a large number of records being stored, each containing data relating to a short time interval. The pegged data from the revelant records can then be used multiple times in a variety of statistical threads or windows rather than having each statistical thread engine peg the information it requires separately.

19 Claims, 4 Drawing Sheets

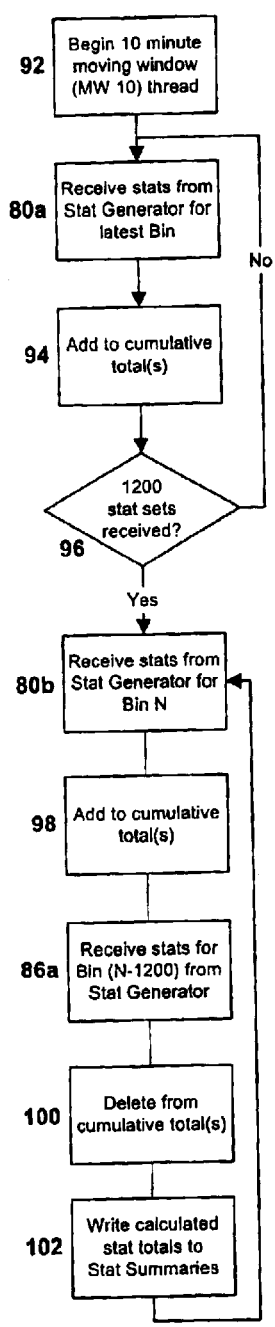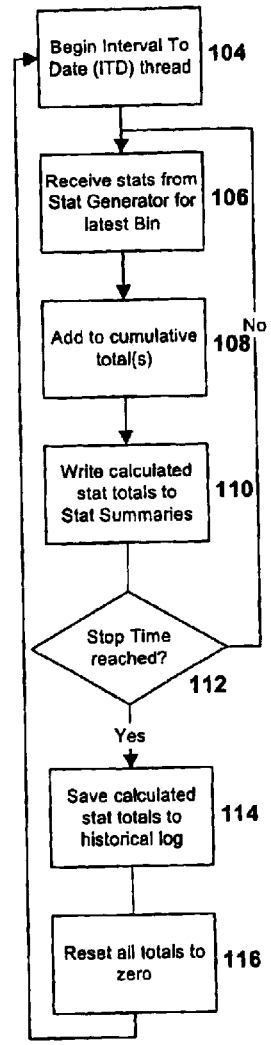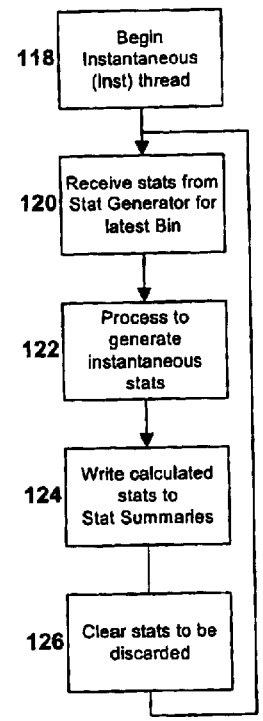
Fig. 7
Fig. 8
Fig. 9

GENERATION AND PROCESSING OF STATISTICAL INFORMATION

FIELD OF THE INVENTION

The present invention relates to methods and apparatus for generating and processing statistical information relating to a system.

BACKGROUND OF THE INVENTION

Statistical information is generated and used in respect of a wide variety of systems. The present invention has particular application in the field of contact centres or call centres in which supervisors have a need to note the activity level of the centre as a whole, of various agents grouped by skillset, or of individual agent activities. Other statistics of primary importance are the numbers of calls waiting, the time of the longest waiting call, etc. While the invention is described in relation to contact centres, it has wider application and can be adapted to many other systems.

In current contact centre technology, statistical information is derived from events (such as a particular agent becoming available to take calls, the arrival of a call at the contact centre, the transfer of a call to an agent, the termination of a call, etc.). These are then fed to a statistics generation programme which typically has a number of modules designed to generate and display a particular type of statistical information. For example, one of the modules might keep track of events notified during the immediately preceding ten minutes and update a number of statistical displays to show the statistics for a moving ten minute window. Another statistical module might operate on a cumulative interval to date (i.e. a cumulative statistical record of events which is updated continually until the module is reset), such as for each eight hour shift, which is zeroed at the beginning of the shift and as events occur, they add to the cumulative statistical data for that eight hour period. A further module might provide instantaneous statistics, such as the number of calls currently waiting, the longest current waiting time for a call, the number of agents busy/idle, etc.

This type of statistical programme is not particularly adaptable and if one wishes to provide a moving fifteen minute window, for example, it is necessary to write a new module which will monitor and collect the relevant event data, calculate the relevant statistics, and display them for this new time window.

SUMMARY OF THE INVENTION

The invention provides a method of generating statistical information from input data relating to the operation of a system over time. The method includes the steps of:
(a) Receiving input data relating to the operation of the system over a finite time interval;
(b) deriving, from the input data, statistical data elements relating to the operation of the system during the finite time interval;
(c) saving the statistical data elements into a memory area identifiable according to the finite time interval to which the data relates; and
(d) repeating steps (a)–(c) for subsequent time intervals, whereby statistical information for a time interval longer than the finite time interval can be derived with reference to the statistical data elements saved in a plurality of the memory areas.

In effect the statistic is "" calculated (or "pegged") once and stored away in discrete records. Each of these records contain statistic for a relatively short finite time interval. Presentation modules, each presenting a different view of these statistics, can access the relevant records which they require at that point in time, allowing for a more efficient use of data Preferably, the input data comprises one or more notifications of events occurring in the system during the finite time interval.

The step of deriving statistical data elements can be carried out by generating an object having one or more statistical parameter identifiers and values associated with the identifier(s).

Alternatively or additionally, the step of deriving statistical data elements can be carried out by retrieving a stored object having a statistical parameter identifier and a value associated with the identifier, and updating the relevant values.

In preferred embodiments, the finite time intervals in subsequent iterations of step (a) are equal to the initial finite time interval, whereby each identifiable memory area relates to an equal time interval. For example, each statistical record might contain the data from a period of 0.5 seconds.

Preferably, each time interval follows immediately from the preceding time interval, whereby a continuous record of the operation of the system is derivable from a plurality of statistical data elements stored in successively created records The method may also include the step of performing statistical calculations immediately after each finite time interval using the statistical data elements generated in respect of the finite time interval, and providing as an output a real time dynamically updated statistical output. Such steps can also be carried out separately from the generation of the information.

The step of performing statistical calculations referred to above may include retrieving from memory one or more stored statistical data elements in respect of a time period preceding the immediately elapsed finite time interval.

In a preferred embodiment the statistical calculations are moving-window calculations and the step of performing the calculations comprises:
adding to a cumulative running total one or more of the statistical data elements in respect of the immediately preceding finite time interval; and
subtracting from the cumulative running total one or more of the statistical data elements in respect of a time period preceding the immediately elapsed finite time interval, the time period being a finite time interval which represents the time immediately before the beginning of the update window of time represented by the updated moving window calculation.

Of course, in a commercially useful product moving window statistics may be accompanied by instantaneous, historical and interval-to-date statistics, all of which are within the scope of the present invention.

The invention is particularly for use when the system is a contact centre and the data represents events occurring in the contact centre.

The invention also provides a system for generating statistical information from input data relating to the operation of a monitored system over time, comprising:
(a) a connection to the monitored system for receiving input data relating to the operation of the monitored system over a finite time interval;
(b) a processor for deriving from the input data statistical data elements relating to the operation of the monitored system during the finite time interval;

(c) a memory comprising a plurality of memory areas, each memory area for saving the statistical data elements and each memory area identifiable according to the finite time interval to which the data relates; and whereby statistical information for a time interval longer than the finite time interval can be derived with reference to the statistical data elements saved in a plurality of the memory areas.

The invention further provides a computer program product for generating statistical information from input data relating to the operation of a system over time, the computer program product comprising instructions which when executed in a computer are effective to cause the computer to:

(a) receive input data relating to the operation of the system over a finite time interval;

(b) derive therefrom statistical data elements relating to the operation of the system during the finite time interval;

(c) save the statistical data elements into a memory area identifiable according to the finite time interval to which the data relates; and (d) repeat steps (a)–(c) for subsequent time intervals, whereby statistical information for a time interval longer than the finite time interval can be derived with reference to the statistical data elements saved in a plurality of the memory areas.

The computer program product may be a carrier such as a magnetic or optical disk (e.g. a hard drive, a tape for a tape drive, a floppy disk, compact disk or digital versatile disk) may be an electronic signal such as an electronic file for downloading over the Internet. It may also be hard-wired in an electronic circuit of a processor.

It will be appreciated by those skilled in the art that a computer system for carrying out the instructions referred to above can be represented by a number of computers each carrying out different interrelated tasks, or by a dedicated electronic circuit (e.g. provided as a module supplied in a dedicated contact centre PBX) which is either programmable or which encodes the instructions referred to above.

In another aspect there is provided a memory structure for recording statistical information relating to the operation of a system over time, the memory structure comprising a plurality of records each for storing one or more statistical data objects, the statistical data objects in each record being generated in respect of events occurring during a given finite time interval, such that a collection of records relating to successive time intervals provides a granular representation of the operation of the system over a period of time.

A further aspect provides a method of processing statistical data stored as statistical data objects, where the objects are grouped together in groups wherein each group represents data in respect of events occurring in a finite period of time, the method comprising the steps of:

storing a current calculated value for a statistical parameter, receiving one or more objects representing events occurring in the most recent time period;

adjusting the parameter using data contained in the received objects;

retrieving from storage a set of objects representing data in respect of an older time period; and adjusting the parameter using data contained in the retrieved objects.

Preferably, the first adjustment involves the addition of data from the received objects and the second adjustment involves the subtraction of data from the retrieved objects.

This method is more advantageous than current methods of calculating statistics in a contact centre statistics generation program. Rather than having each module calculate the data it requires and store the data separately, the data can be calculated using the relevant data records.

Preferably, this method is applied to a moving time window calculation and the "older time period" is that period at the beginning of the moving time window before window is updated to take the most recent data into account.

The invention also provides a system for processing statistical data stored as statistical data objects, where the objects are grouped together in groups wherein each group represents data in respect of events occurring in a finite period of time, the system comprising:

a memory for storing a current calculated value for a statistical parameter, a communications link for receiving one or more objects representing events occurring in the most recent time period; and a processor effective to:

adjust the parameter by using data contained in the received objects;

retrieve from storage a set of objects representing data in respect of an older time period; and adjust the parameter by using data contained in the retrieved objects.

There is further provided a computer program product for processing statistical data stored as statistical data objects, where the objects are grouped together in groups wherein each group represents data in respect of events occurring in a finite period of time, the computer program product comprising instructions which when executed in a computer are effective to cause the computer to:

store a current calculated value for a statistical parameter, receive one or more objects representing events occurring in the most recent time period;

adjust the parameter by using data contained in the received objects;

retrieve from storage a set of objects representing data in respect of an older time period; and adjust the parameter by using data contained in the retrieved objects.

In another aspect the invention provides a contact centre management system comprising:

(i) a contact management unit for controlling the processing of contacts handled by the contact centre;

(ii) an event generator for generating event notifications in response to activities occurring under the control of the contact management unit; and (iii) a system for generating statistical information from the event notifications, the system comprising:

(a) a connection to the event generator for receiving event notifications relating to the operation of the contact centre over a finite time interval;

(b) a processor for deriving from the event notifications statistical data elements relating to the operation of the monitored system during the finite time interval;

(c) a memory comprising a plurality of memory areas, each memory area for saving the statistical data elements and each memory area identifiable according to the finite time interval to which the data relates; and whereby statistical information for a time interval longer than the finite time interval can be derived with reference to the statistical data elements saved in a plurality of the memory areas.

BRIEF DESCRIPTION OF DRAWINGS

The invention will now be illustrated by the following descriptions of embodiments thereof given by way of example only with reference to the accompanying drawings, in which:

FIG. 7 is a flow chart of the operation of a statistics generator for a ten minute moving window thread;

FIG. 8 is a flow chart of the operation of a statistical generator for an interval to date thread; and FIG. 9 is a flow chart of the operation of a statistics generator for an instantaneous thread.

DETAILED DESCRIPTION OF PREFERRED EMBODIMENTS

Figure 1:
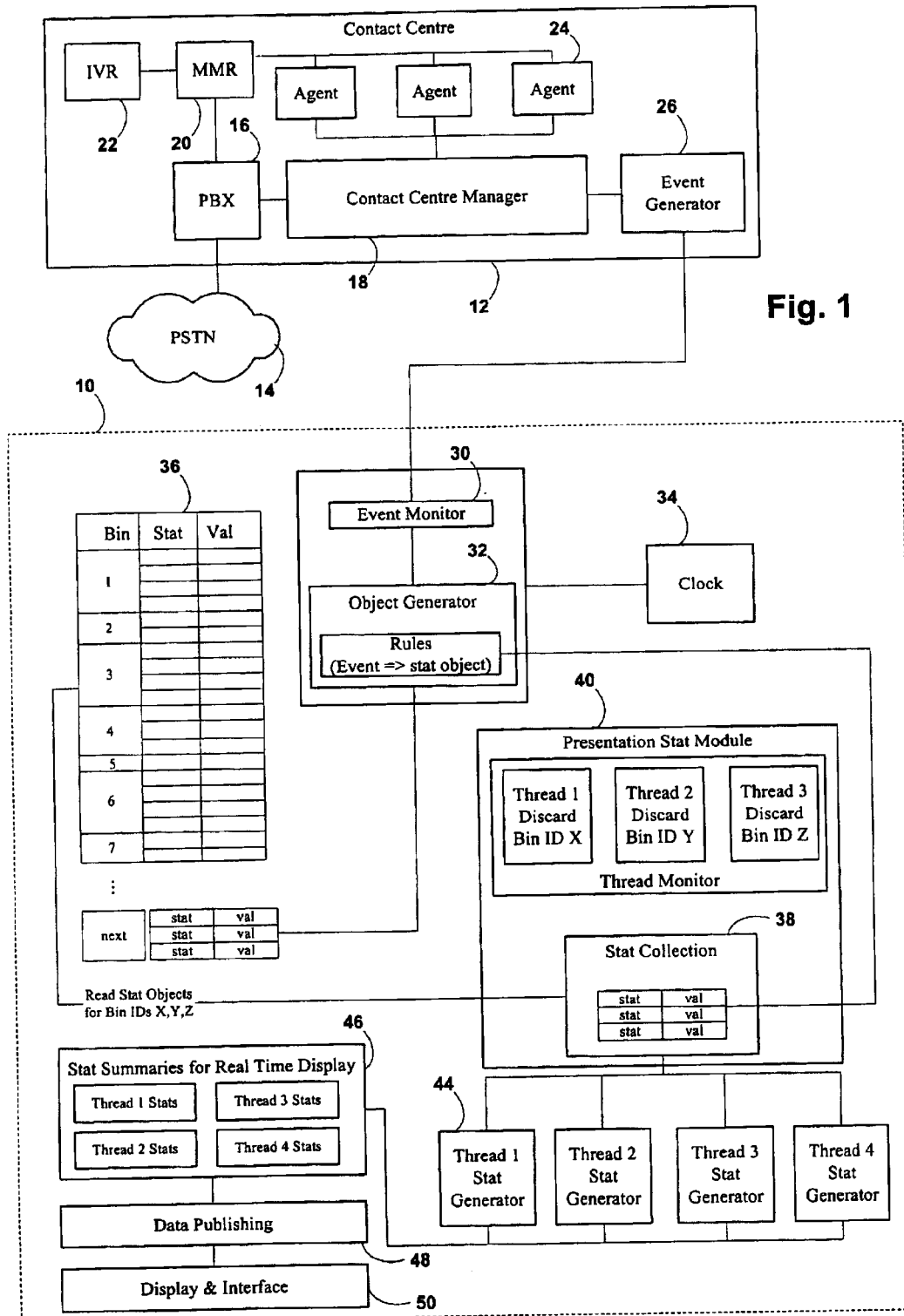
FIG. 1 is an architecture of a system for generating and processing statistical information.

FIG. 1 shows a block diagram architecture of a system 10 for generating and processing statistical information. The system 10 is designed in particular for a contact centre 12 which is itself conventional.

The contact centre 12 receives calls from the public switch telephone network (PSTN) 14 (or from a wide area network such as the internet) at a private branch exchange (PBX) 16. In the case of calls received from the internet, a gateway would be provided to convert the calls to a format recognised by the PBX. The contact center can also receive contacts via the internet such as E-mail or a chat session request, but voice calls are used here as illustrative purpose. When a call reaches the PBX 16, basic information regarding the call, such as the calling line ID and any database information relating to the caller derivable from this calling line ID is passed to a contact centre manager 18 which controls the operation of the contact centre 12.

Typically, a call might then be routed, using a multimedia router 20, to an interactive voice response system/application 22. The IVR system collects information regarding the skillset required for an agent to handle the call from responses input by the caller to recorded prompts. When the call has been processed through the IVR system, it is returned to the PBX 16 and the contact centre manager 18 is provided by the IVR application with the information collected regarding the caller's skillset requirements. The call is then typically held at the PBX while the contact centre manager places the contact information into a queue with a priority. Contacts are then allocated from the queue to agents according to their priority level and waiting time, and in this way calls held at the PBX are instructed to be routed to an individual agent 24 via the multimedia router 20. When an agent has finished with a call, the contact centre manager updates the agent queue and allocates a new call to the agent (presuming that there is a call waiting for the agent which the agent is equipped to handle).

An event generator 26 associated with the contact centre manager 18 is notified of each change in status of a contact or of an agent, and generates an event message in a known manner to the statistical system 10. As is well known in the art, these event notifications are used to generate the statistics of interest to a contact centre supervisor. However, the manner in which the statistical system 10 generates the final statistics is different from that of conventional systems.

In the statistical system 10, an event monitor 30 monitors a communications channel for events arriving from the event generator 26. The details of each event are passed to an object generator 32 which is programmed with a set of rules according to which statistical software objects are generated for each new event. The object generator can also, as an alternative, update existing objects which are already stored. For example, when a call is placed on hold, a first object may be generated noting the time at which the call was initially received for use in the subsequent generation of the "longest waiting call" statistic. In addition, a statistical object might already exist for the number of waiting calls, and the value of this stat would be incremented by one when the new call is placed on hold.

The object generator is controlled by a clock 34 which supplies a timing pulse to the object generator every 0.5 seconds. All of the events arriving within a 0.5 second period are collated and generate or update a group of objects which are collectively transferred at the end of the 0.5 second period to a memory area on disk referred to herein as a "record". The memory area is indicated schematically at 36 from which it can be seen that a sequence of records stored, each having one or more objects. Each object includes (in this representation) the identity of a particular statistical parameter or "stat" and the value(s) allocated by the object generator to that stat according to the event(s) received during the 0.5 second period.

The value of 0.5 seconds is chosen as a useful short time in the context of events arriving at a contact centre. The skilled person will appreciate that if the system being monitored was, for example, ships arriving into and leaving a harbour, each record might store events occurring in a single hour. On the other hand, for a very fast moving system such as a very busy web server where thousands of page requests are received per second, or indeed a nuclear accelerator where collisions occur on the nanosecond scale, a much shorter time period might be chosen for each record. The criteria according to which the time period is chosen are that it should be short in relation to the operating time of the system and provide a useful granularity for the statistics being generated.

In addition to recording the objects generated during the 0.5 second period in memory 36, the object generator passes, at the end of each 0.5 second period, the stats and values associated with the events occurring in the last 0.5 seconds to a stat collection module 38 forming part of a statistics presentation module 40. The statistics presentation module also includes a thread monitor 42 for use in updating the various threads being recorded. A "thread" in this sense is a particular statistical record or display, such as a moving ten minute window, a cumulative interval to date, or an instantaneous display of system parameters.

Figure 2:
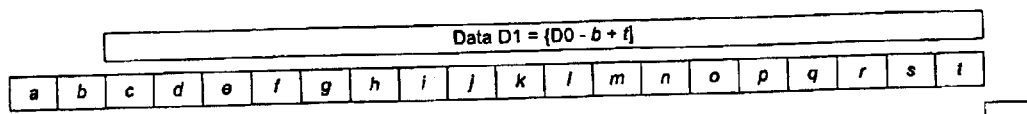
FIG. 2 is a schematic representation of the data in a moving window calculation at a first point in time.

Referring to FIG. 2, an example of a moving window thread is schematically represented. The individual records are lettered a, b, c, etc. Each record contains data relating to various stats. The data in a moving window can be considered as the sum of the data in a consecutive sequence of records. Thus, data D1, which is the moving window at a particular point and time, just before the latest record u is added, is the cumulative sum of the data in records c to t.

Figure 3:
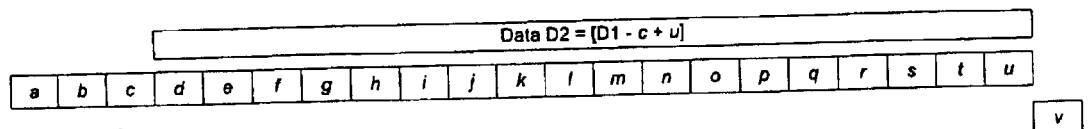
FIG. 3 is a schematic representation of the data in the moving window of FIG. 2 a short time later.

However, rather than storing in memory all of the stats and values in records c to t, a simple calculation is used to update the data after the new record u is added. Thus, in FIG. 3, it can be seen that the data window which now represents the updated data set D2 i.e. the cumulative sum of records d to u, is simply the data set D1 minus the oldest data c (no longer in the window) plus the newest data u from the latest half second. Therefore, in order to make the calculation to arrive at the date of set D2, the only information needed is the former results of calculating set D1, the new values in record u and the discarded values in record c. In the same way, FIG. 2 shows data D1 as being the data is at D0 (from the previous half second, not shown)−b+t.

Figure 4:
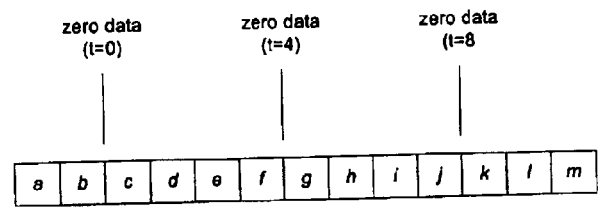
FIG. 4 is a schematic representation of the data in a cumulative interval to date statistical module.

Similarly, FIG. 4 represents a cumulative interval to date window which is periodically zeroed and restarted. For simplicity the window is shown as being of a duration equal to the sum of four records (in this case 2 seconds), though in reality time scales of one hour, four hours or eight hours are more likely for this type of interval to date window in the context of a contact centre.

The data is zeroed at t=0, t=4 and t=8. In the intervening half second periods, the information from a new record is added at t=1 (when the cumulative data is equivalent to record c), t=2 (cumulative data equivalent to records c+d), t=3 (cumulative data equivalent to records c+d+e) and t=4 (cumulative data equivalent to records c+d+e+f). At t=5, the data is simply cleared and the new record g is used as a starting point for the new interval to date. At t=6, record h is added and the cumulative data is therefore equivalent to records g+h, etc. It is therefore only necessary to retain the current value of the data set and to make calculations with small numbers of new records or discarded records in order to track statistical values over long periods.

Reverting to FIG. 1, the thread monitor keeps track of those threads for which data needs to be discarded in the next 0.5 second. For a ten minute moving window using 0.5 second records, for example, the window is represented by the 1200 most recent records. Therefore, when the contents of a new record are received, the values from the $1200^{th}$ oldest record need to be discarded and one of the thread monitor modules will keep track of the record ID number of the current $1200^{th}$ oldest record. The stat collection module, upon receipt of a new set of stats and values, will be instructed by the thread monitor module 42 as to which record objects are to be discarded in each thread and will read these stat objects for the identified records.

Stat collection module 38 then passes the new stat objects (from the most recent 0.5 second period) as well as the objects to be discarded from the $1200^{th}$ oldest record (together with any records to be discarded from other threads) to the respective thread stat generators 44, each of which is responsible for generating the statistical information for a particular thread.

Each thread stat generator 44 carries out the calculations based on the new stat objects received and the stat objects (if any) to be discarded and stores the new calculated stat values in a stat summary memory area 46. A data publishing programme 48 is provided to retrieve the stored stat values and dynamically update a display and interface 50 with the new statistical information (e.g. on a graphical display screen).

Figure 5:
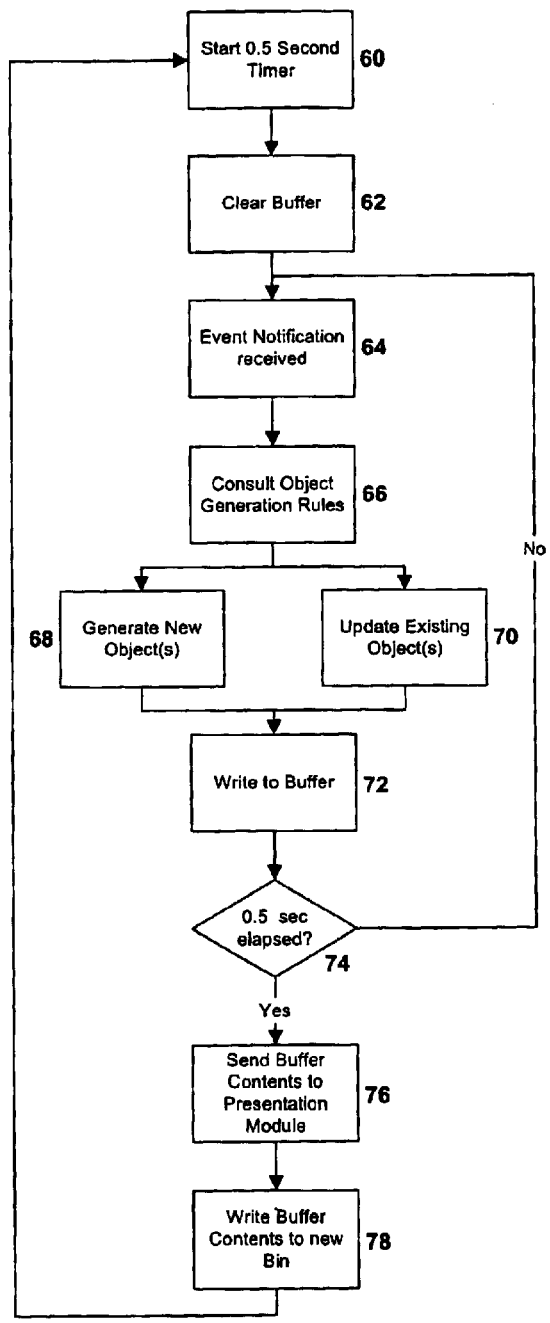
FIG. 5 is a flow chart of the operation of a statistic generator.

The operation of the object generator will now be described in more detail with reference to FIG. 5. At the start of a 0.5 second time interval as measured by the clock 34, step 60, an internal buffer is cleared, step 62. This removes the stats and values generated in the last 0.5 seconds from a temporary memory or buffer. When the first event notification is received, step 64, the object generation rules are consulted to determine what type of object needs to be generated and/or updated based on the particular event received, step 66.

The rules may specify that one or more new objects needs to be generated, step 68 and/or that one or more existing objects in the buffer needs to be updated, step 70. The objects are generated and/or updated as necessary and written as a stat ID and a value to the buffer, step 72. A check is then conducted to determine if 0.5 seconds has yet elapsed (as measured by the receipt of a new pulse from the clock 34) and if not, the process reverts to step 64 and the next event notification is awaited.

If, at decision 74, a clock pulse has arrived and 0.5 seconds is therefore determined to have elapsed, the buffer contents are sent to the stat collection module of the presentation stats module 40, step 76. In addition, the buffer contents are written to a new record in memory 36, step 78. The process then reverts to step 60 where a new 0.5 second time period has started and the buffer is cleared in step 62, etc.

Figure 6:
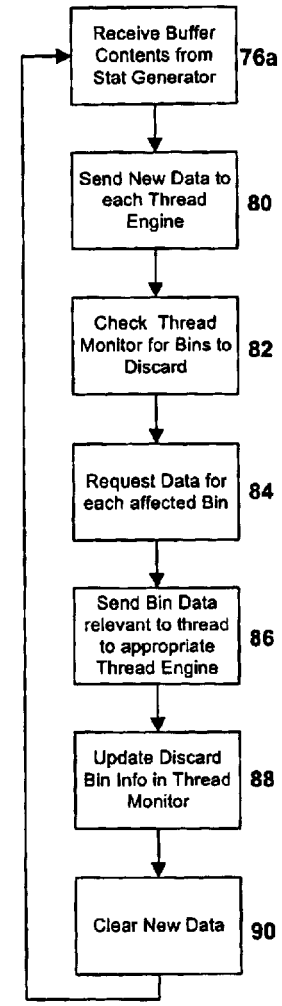
FIG. 6 is a flow chart of the operation of a presentation module.

FIG. 6 shows the operation of the stat collection module. When the buffer contents are received from the stat generator, step 76a, the new data received is sent to each of the thread engines or thread stat generators 44, step 80. Then in step 82, the thread monitor is checked for the identities of records to be discarded by each individual thread. Upon receipt of the information from the thread monitor, the stat collection module 38 requests the data for each of the affected records to be discarded, step 84, and then sends this record data to the appropriate thread engine 44, step 86. The stat collection module notifies the thread monitor that the discarded record contents have been passed to the thread stat generators and the thread monitors then update the discarded record information for each thread, step 88. Finally, in step 90, the stat collection module clears the "new data" received from the object generator from memory to prepare for the next set of buffer contents to be received in step 76a.

FIG. 7 is an exemplary flow chart of the operation of a thread stat generator 44 for a ten minute moving window thread. After the module starts, step 92, the thread stat generator or thread engine 44 receives the stats from the stat generator for the latest 0.5 second period, step 80a (this information having been sent in step 80, FIG. 6). This data is added to the cumulative totals, step 94, and since the process is only recently commenced, a decision point is reached, step 96 to check whether 1200 stats sets have been received. If not, stats are accumulated in a repetition of steps 80a and 94 until 1200 stat sets have been received (equivalent to 10 minutes worth of 0.5 second records).

When 1200 stat sets have been received, and the next set of stats are received from the stat generator for the latest record N, step 80b, these are added to the cumulative totals, step 98. The thread monitor will have identified record N−1200 as being the record to discard for this thread and thus the contents of this record are retrieved by the stat collection module and sent to the thread stat generator in step 86 (FIG. 6). The stats are received (FIG. 7) in step 86a and the values associated with the objects in the record are deleted from the relevant cumulative totals, step 100. The calculated stat totals are stored in temporary memory for the next set of calculations and are written into the stat summary tables in memory area 46 to allow them to be used in the updated display, step 102.

FIG. 8 shows the operation of a thread engine for an interval to date (ITD) thread. The thread begins, step 104 and stats are received for the latest record from the stat generator, step 106. These are added to the cumulative totals (which begin at 0), step 108 and the calculated stat totals are written by the engine to the stat summary table 110. A check is then conducted, step 112 to see if the stop time has been reached, and if not, stats 106, 108, 110 and 112 are repeated until the stop time has in fact been reached. At that point, the calculated stat totals are written to a historical log to provide a permanent record of the stat totals, step 114, and then all of the totals are reset to 0, step 116 before reverting to step 104.

In FIG. 9, when an instantaneous thread begins, step 118, and the first set of stats are received from the stat generator, step 120 these are processed to generate instantaneous statistics, step 122. Calculated stats are written to the stat summary table, step 124 and then any stats which need to be discarded (i.e. which will not be used when updating the instantaneous thread in the next 0.5 seconds) are cleared from memory, step 126 before reverting to step 120.

It will be appreciated that the description given is necessarily simplified and that the calculation of some statistics may involve more than the simple deletion from and addition to cumulative totals. Nevertheless, the system and method described herein provides for statistical information to be pegged once at a central location, recorded in short time steps in records, and then accessed by individual thread engines in whatever manner is required to derive usable statistics.

It will also be appreciated that the addition of e.g. a fifteen minute moving window thread to the described system would simply require the thread monitor to be updated with the identity of which record objects to discard at each step (N-1800), and the addition of a stat generator module specifying which stats to track and how to perform the necessary calculations to arrive at the values to display based on the data contained and the objects received from the records. Previously, the addition of such a new moving window calculation would have required an entirely new programme to be written to monitor for and peg specific events, generate a new set of statistics, track these statistics in memory and calculate the values to display.

In addition, since the records are saved it is relatively easy to recreate the individual threads in the event of a breakdown in communication or temporary failure of the object generator or presentation stat module.

The invention is not limited to the embodiments described herein which may be varied or modified without departing from the spirit and scope of the claimed invention.

What is claimed is:

1. A method of generating statistical information from input data relating to the operation of a system over time, comprising the steps of:
    (a) receiving input data relating to the operation of said system over a finite time interval;
    (b) deriving therefrom statistical data elements relating to the operation of the system during said finite time interval;
    (c) saving said statistical data elements into a memory area identifiable according to the finite time interval to which the data relates; and
    (d) repeating steps (a)–(c) for subsequent time intervals, whereby statistical information for a time interval longer than said finite time interval can be derived with reference to the statistical data elements saved in a plurality of said memory areas.

2. A method as claimed in claim 1, wherein said input data comprises one or more notifications of events occurring in the system during said finite time interval.

3. A method as claimed in claim 1, wherein the step of deriving statistical data elements comprises generating an object having a statistical parameter identifier and a value associated with said identifier.

4. A method as claimed in claim 1, wherein the step of deriving statistical data elements comprises retrieving a stored object having a statistical parameter identifier and a value associated with said identifier, and updating said value.

5. A method as claimed in claim 1, further comprising the step of sending said statistical data to a statistical information collection module for use in updating statistics in real time.

6. A method as claimed in claim 1, wherein said finite time intervals in subsequent iterations of step (a) are equal to the initial finite time interval, whereby each identifiable memory area relates to an equal time interval.

7. A method as claimed in claim 6, wherein each time interval follows immediately from the preceding time interval, whereby a continuous record of the operation of the system is derivable from a plurality of statistical data elements stored in successively created memory areas.

8. A method as claimed in claim 1, further comprising the step of performing statistical calculations immediately after each finite time interval using the statistical data elements generated in respect of said finite time interval, and providing as an output a real time dynamically updated statistical output.

9. A method as claimed in claim 8, wherein said step of performing statistical calculations includes retrieving from memory one or more stored statistical data elements in respect of a time period preceding the immediately elapsed finite time interval.

10. A method as claimed in claim 9, wherein said statistical calculations are moving-window calculations and said step of performing said calculations comprises:
    adding to a cumulative running total one or more of said statistical data elements in respect of the immediately preceding finite time interval; and
    subtracting from said cumulative running total one or more of said statistical data elements in respect of a time period preceding the immediately elapsed finite time interval, said time period being a finite time interval which represents the time immediately before the beginning of the update window of time represented by the updated moving window calculation.

11. A method as claimed in claim 1, wherein said system is a contact centre and said data represents events occurring in the contact centre.

12. A system for generating statistical information from input data relating to the operation of a monitored system over time, comprising:
    (a) a connection to the monitored system for receiving input data relating to the operation of said monitored system over a finite time interval;
    (b) a processor for deriving from said input data statistical data elements relating to the operation of the monitored system during said finite time interval;
    (c) a memory comprising a plurality of memory areas, each memory area for saving said statistical data elements and each memory area identifiable according to the finite time interval to which the data relates; and
    whereby statistical information for a time interval longer than said finite time interval can be derived with reference to the statistical data elements saved in a plurality of said memory areas.

13. A computer program product for generating statistical information from input data relating to the operation of a system over time, said computer program product comprising instructions which when executed in a computer are effective to cause said computer to:
   (a) receive input data relating to the operation of said system over a finite time interval;
   (b) derive therefrom statistical data elements relating to the operation of the system during said finite time interval;
   (c) save said statistical data elements into a memory area identifiable according to the finite time interval to which the data relates; and
   (d) repeat steps (a)–(c) for subsequent time intervals, whereby statistical information for a time interval longer than said finite time interval can be derived with reference to the statistical data elements saved in a plurality of said memory areas.

14. A memory structure for recording statistical information relating to the operation of a system being stored over time, said memory structure comprising a plurality of records being stored, each for storing one or more statistical data objects, the statistical data objects in each record being generated in respect of events occurring during a given finite time interval, such that a collection of records relating to successive time intervals provides a granular representation of the operation of the system over a period of time.

15. A method of processing statistical data stored as statistical data objects, where said objects are grouped together in groups wherein each group represents data in respect of events occurring in a finite period of time, said method comprising the steps of:
   storing a current calculated value for a statistical parameter,
   receiving one or more objects representing events occurring in the most recent time period;
   adjusting said parameter by adding data contained in said received objects;
   retrieving from storage a set of objects representing data in respect of an older time period; and
   adjusting said parameter by subtracting data contained in said retrieved objects.

16. A method as claimed in claim 15, wherein said method is applied to a moving time window calculation and said older time period is the time period representing the beginning of the moving time window before the most recent time period is taken into account.

17. A system for processing statistical data stored as statistical data objects, where said objects are grouped together in groups wherein each group represents data in respect of events occurring in a finite period of time, said system comprising:
   a memory for storing a current calculated value for a statistical parameter,
   a communications link for receiving one or more objects representing events occurring in the most recent time period; and
   a processor effective to:
      adjust said parameter by adding data contained in said received objects;
      retrieve from storage a set of objects representing data in respect of an older time period; and
      adjust said parameter by subtracting data contained in said retrieved objects.

18. A computer program product for processing statistical data stored as statistical data objects, where said objects are grouped together in groups wherein each group represents data in respect of events occurring in a finite period of time, said computer program product comprising instructions which when executed in a computer are effective to cause said computer to:
   store a current calculated value for a statistical parameter,
   receive one or more objects representing events occurring in the most recent time period;
   adjust said parameter by adding data contained in said received objects;
   retrieve from storage a set of objects representing data in respect of an older time period; and
   adjust said parameter by subtracting data contained in said retrieved objects.

19. A contact centre management system comprising:
   (i) a contact management unit for controlling the processing of contacts handled by said contact centre;
   (ii) an event generator for generating event notifications in response to activities occurring under the control of said contact management unit; and
   (iii) a system for generating statistical information from said event notifications, said system comprising:
      (a) a connection to the event generator for receiving event notifications relating to the operation of said contact centre over a finite time interval;
      (b) a processor for deriving from said event notifications statistical data elements relating to the operation of the monitored system during said finite time interval;
      (c) a memory comprising a plurality of memory areas, each memory area for saving said statistical data elements and each memory area identifiable according to the finite time interval to which the data relates; and
   whereby statistical information for a time interval longer than said finite time interval can be derived with reference to the statistical data elements saved in a plurality of said memory areas.

* * * * *